United States Patent
Evans et al.

(10) Patent No.: US 12,180,378 B2
(45) Date of Patent: Dec. 31, 2024

(54) COLORIMETRIC SENSOR FORMULATION AND USE THEREOF

(71) Applicant: THE PROVOST, FELLOWS, FOUNDATION SCHOLARS, AND THE OTHER MEMBERS OF BOARD, OF THE COLLEGE OF THE HOLY AND UNDIVIDED TRINITY OF QUEEN ELIZABETH, NEAR DUBLIN, Dublin (IE)

(72) Inventors: Rachel Evans, Dublin (IE); Steve Comby, Dublin (IE)

( * ) Notice: Subject to any disclaimer, the term of this patent is extended or adjusted under 35 U.S.C. 154(b) by 871 days.

(21) Appl. No.: 17/271,218

(22) PCT Filed: Aug. 31, 2019

(86) PCT No.: PCT/EP2019/073290
§ 371 (c)(1),
(2) Date: Feb. 25, 2021

(87) PCT Pub. No.: WO2020/048895
PCT Pub. Date: Mar. 12, 2020

(65) Prior Publication Data
US 2021/0246326 A1    Aug. 12, 2021

(30) Foreign Application Priority Data

Sep. 3, 2018   (EP) .................... 18192329

(51) Int. Cl.
*C09D 11/50*   (2014.01)
*C09K 11/06*   (2006.01)
(Continued)

(52) U.S. Cl.
CPC .............. *C09D 11/50* (2013.01); *C09K 11/06* (2013.01); *G01N 21/29* (2013.01); *G01N 21/33* (2013.01);
(Continued)

(58) Field of Classification Search
CPC . C09D 11/50; C09K 11/06; C09K 2211/1048; C09K 2211/185; C09K 11/07;
(Continued)

(56) References Cited

U.S. PATENT DOCUMENTS

| 6,602,716 B1 | 8/2003 | Klimant |
| 10,569,514 B2 | 2/2020 | Vaanhold et al. |

(Continued)

FOREIGN PATENT DOCUMENTS

| CN | 103616361 A | 3/2014 |
| CN | 108 084 366 A | 5/2018 |

(Continued)

OTHER PUBLICATIONS

Au Official Action For 2019334109; Sep. 3, 2018.
(Continued)

*Primary Examiner* — Jill A Warden
(74) *Attorney, Agent, or Firm* — Patshegen IP; Moshe Pinchas (57) ABSTRACT

The invention relates to a luminescence-based colorimetric sensor formulation and method of use thereof. The sensor formulation can be used to assess oxygen concentration, particularly in controlled oxygen atmospheres such as food packaging. In embodiments, the invention also relates to sensor-containing laminate films for food packaging, and methods of their preparation.

13 Claims, 4 Drawing Sheets

(51) Int. Cl.
*G01N 21/29* (2006.01)
*G01N 21/33* (2006.01)
*G01N 31/22* (2006.01)

(52) U.S. Cl.
CPC .... *G01N 31/225* (2013.01); *C09K 2211/1048* (2013.01); *C09K 2211/185* (2013.01)

(58) Field of Classification Search
CPC ...... G01N 21/29; G01N 21/33; G01N 31/225; G01N 31/22
See application file for complete search history.

(56) References Cited

U.S. PATENT DOCUMENTS

| | | |
|---|---|---|
| 2006/0141106 A1 | 6/2006 | Kodama et al. |
| 2012/0276647 A1* | 11/2012 | Mills .................... G01N 31/223 436/136 |
| 2014/0179019 A1 | 6/2014 | Dabiri et al. |
| 2021/0048390 A1* | 2/2021 | Löbbert ............... G01N 21/643 |

FOREIGN PATENT DOCUMENTS

| | | |
|---|---|---|
| JP | 2008069278 A | 9/2009 |
| JP | 2013-53901 A | 3/2013 |
| WO | 2004/077035 A1 | 9/2004 |
| WO | 2005/015181 A1 | 2/2005 |
| WO | 2014/195451 A1 | 12/2014 |
| WO | 2021/052934 * | 3/2021 |

OTHER PUBLICATIONS

Zike Jiang et al, "Ratiometric Dissolved Oxygen Sensors Based On Ruthenium Complex Doped With Silver Nanoparticles", Sensors 2017, 17, 548.
Au Official Action For 2019334109; Aug. 2023.
JP OA; JP2021-512239; Jun. 20, 2023.
CN Official Action; Apr. 15, 2022.
ISR; European Patent Office, NL; Dec. 9, 2019.
European Search Report; Munich; Feb. 27, 2019.

* cited by examiner

(vii)

(viii)

COLORIMETRIC SENSOR FORMULATION AND USE THEREOF

TECHNICAL FIELD

The present invention relates to a luminescence-based colorimetric sensor formulation, a printable ink comprising same, and methods of use thereof. The colorimetric sensor can be used to determine oxygen concentration, particularly in controlled oxygen atmospheres such as packaging of foodstuffs, medical products and electronic components. In embodiments, the invention also relates to laminate films comprising printed colorimetric sensors, and methods of their preparation.

BACKGROUND

In recent years, the use of protective atmosphere packaging has increased substantially due to a number of factors, including stringent food safety requirements, increased demand for fresh produce, the importation of non-native and non-seasonal foodstuffs, and increases in the use of disposable sterile medical products and electronic components.

Protective atmosphere packaging generally includes gas-free (i.e. vacuum packaging) and modified atmosphere packaging (MAP). A gas-free environment is made by expelling all of the air, and therefore the oxygen, from the packaging under vacuum. Gas-free environments are favoured for the packaging of products that are susceptible to oxidative degradation, which include electronic components, pharmaceuticals and foodstuffs. MAP is created by altering the normal gas composition of air (78% nitrogen, 21% oxygen, 1% trace gases) within the packaging. These processes provide atmospheres that inhibit the primary food spoilage processes, thereby extending shelf-life of the products and enhancing food quality and safety.

Oxygen ($O_2$) and carbon dioxide ($CO_2$) are the most commonly used gases for MAP. Generally, the modified atmosphere is tailored to the product to be packaged, with fruit and vegetables as well as cooked meats typically being stored under low oxygen atmospheres (0-20%) and raw red meat and poultry products being stored under higher oxygen atmospheres (20-80%), for example. The partial pressures of these gases ($pCO_2$, $pO_2$) within the packaging head space can fluctuate over time and are influenced by factors such as the product type, microbial activity, storage conditions, and the packaging material and integrity. Since any leaks or damage to the packaging will induce the loss of the modified atmosphere and a return to ambient air conditions, and improper gas filling can lead to an incorrect atmosphere being created within the packaging, the composition of the gas in the packaging headspace can provide a useful indication of the packaging integrity and reliability of the filling process, as well as of the freshness and safety of the packaged foodstuff.

Thin film oxygen sensors for the assessment of oxygen in food packaging are known. In these known sensors, the sensor response is typically based on a change in an optical property, such as absorbance or luminescence, as a function of oxygen concentration. Absorbance-based sensors are typically preferred for these applications as the sensor response—usually a colour change—enables qualitative, and sometimes semi-quantitative oxygen determination to be made without the need for expensive detection instrumentation or expertise. However, the sensitivity of absorbance-based detectors is poor, and external instrumentation is required for fully quantitative measurements. Absorbance-based sensors are also non-reversible, and are unable to provide a real-time response. They are also unable to provide a direct measurement of the $O_2$ concentration at the time of pack sealing and therefore cannot be used for quality control inspection at the packaging source.

Luminescence-based sensors offer an alternative to absorbance-based sensors and provide a non-destructive means of quantitative detection. Luminescence-based sensors, such as those described in WO2004/077035 A1 and US2014/179019 A1 are known. However, as these sensors record the phase-shifted emission (lifetime or decay-based) and/or the emission intensity, the resulting sensor response is not visually perceptible, meaning that spectroscopic instrumentation, and the associated expertise to work the instrumentation, is required. These factors have significant cost implications, making such known methods unsuitable for commercial scale-up.

It is an aim of the invention to obviate or mitigate one or more of the disadvantages associated with the prior art. Ideally, it would be advantageous to provide a tuneable colorimetric sensor formulation which can deliver a specific colour change over a relevant oxygen concentration range. A formulation which could be provided as an ink, for printing onto substrates such as films for laminate packaging would be advantageous, especially for the food packaging industry. A sensor which could be used with minimal external instrumentation, and which could provide advantages such as in-situ, cost-effective, and/or non-destructive determination of oxygen concentration would be highly beneficial. Finally, a high-throughput method allowing determination of oxygen concentration in packaged items, such as foodstuffs, as a quality control too, or as an indicator of the integrity of the food packaging or of the food freshness or safety, would be distinctly advantageous.

SUMMARY OF THE INVENTION

According to the present invention there is provided a colorimetric oxygen sensor formulation comprising a first lumophore and a second lumophore dispersed in a polymer matrix, wherein:

(i) the first lumophore is platinum 5,10,15,20-tetrakis(2,3,4,5,6-pentafluorophenyl)porphyrin (PtTFPP) and the second lumophore is 3-(2-benzothiazolyl)-7-(diethylamino) coumarin (C6);

(ii) the first lumophore is platinum 5,10,15,20-tetrakis(2,3,4,5,6-pentafluorophenyl)porphyrin (PtTFPP) and the second lumophore is 2,3,6,7-tetrahydro-9-trifluoromethyl-1H,5H-quinolizino (9,1-gh) coumarin (C153);

(iii) the first lumophore is platinum octaethylporphyrin (PtOEP) and the second lumophore is 2,3,6,7-tetrahydro-9-trifluoromethyl-1H,5H-quinolizino (9,1-gh) coumarin (C153);

(iv) the first lumophore is platinum octaethylporphyrin (PtOEP) and the second lumophore is 7-benzylamino-4-nitrobenz-2-oxa-1,3-diazole (BBD);

(v) the first lumophore is platinum octaethylporphyrin (PtOEP) and the second lumophore is rhodamine 6G (R6G);

(vi) the first lumophore is ruthenium (II) 4,7-diphenyl-1,10'-phenanthroline $[Ru(dpp)_3]^{2+}$ and the second lumophore is 3-(2-benzothiazolyl)-7-(diethylamino) coumarin (C6);

(vii) the first lumophore is ruthenium (II) 4,7-diphenyl-1,10'-phenanthroline $[Ru(dpp)_3]^{2+}$ and the second lumophore is 2,3,6,7-tetrahydro-9-trifluoromethyl-1H,5H-quinolizino(9,1-gh) coumarin (C153);

(viii) the first lumophore is ruthenium (II) 4,7-diphenyl-1,10'-phenanthroline [Ru(dpp)$_3$]$^{2+}$ and the second lumophore is rhodamine 6G (R6G);

(ix) the first lumophore is platinum meso-tetraphenylporphyrin (PtTPP) and the second lumophore is 3-(2-benzothiazolyl)-7-(diethylamino) coumarin (C6);

(x) the first lumophore is platinum meso-tetraphenylporphyrin (PtTPP) and the second lumophore is 2,3,6,7-tetrahydro-9-trifluoromethyl-1H,5H-quinolizino(9,1-gh) coumarin (C153);

(xi) the first lumophore is platinum meso-tetraphenylporphyrin (PtTPP) and the second lumophore is 7-benzylamino-4-nitrobenz-2-oxa-1,3-diazole (BBD);

(xii) the first lumophore is platinum meso-tetraphenylporphyrin (PtTPP) and the second lumophore is rhodamine 6G (R6G);

(xiii) the first lumophore is palladium 5,10,15,20-tetrakis(2,3,4,5,6-pentafluorophenyl)porphyrin (PdTFPP) and the second lumophore is 3-(2-benzothiazolyl)-7-(diethylamino) coumarin (C6);

(xiv) the first lumophore is palladium 5,10,15,20-tetrakis(2,3,4,5,6-pentafluorophenyl)porphyrin (PdTFPP) and the second lumophore is 2,3,6,7-tetrahydro-9-trifluoromethyl-1H,5H-quinolizino (9,1-gh) coumarin (C153); Or wherein the first lumophore is selected from:

pyrene, erythrosine B, ruthenium (II) 1,10-phenanthroline ([Ru(phen)$_3$]2+), osmium (II) 1,10-phenanthroline ([Os(phen)$_3$]2+), ruthenium (II) 4,7-diphenyl-1,10'-phenanthroline ([Ru(dpp)$_3$]2+), osmium (II) 4,7-diphenyl-1,10'-phenanthroline ([Os(dpp)$_3$]2+), meso-tetraphenylporphyrin (TPP), platinum meso-tetraphenylporphyrin (PtTPP), platinum 5,10,15,20-tetrakis(4-carboxyphenyl)porphyrin (PtTCPP), platinum 5,10,15,20-tetrakis(2,3,4,5,6-pentafluorophenyl)porphyrin (PtTFPP), platinum coproporphyrin (PtCP), platinum coproporphyrin tetraethyl ester (PtCPTEE), platinum meso-tetra(2,6-dichlorophenyl) porphyrin (PtTDCPP), platinum meso-tetra(3,5-bis(trifluoromethyl)phenyl)-porphyrin (PtTFMPP), platinum meso-tetrakis(4-N-methylpyridyl)porphyrin (PtTMPyP$^{4+}$), palladium meso-tetraphenyltetrabenzoporphyrin (PdTPTBP), palladium 5,10,15,20-tetrakis (4-carboxyphenyl)porphyrin (PdTCPP), palladium meso-tetraphenylporphyrin (PdTPP), palladium 5,10,15,20-tetrakis(2,3,4,5,6-pentafluorophenyl)porphyrin (PdTFPP)]; Or the second lumophore is selected from acriflavine, proflavine, rhodamine 110, rhodamine green (5(6)-carboxyrhodamine 110), 5-carboxyfluorescein, eosin Y, 8-(phenylamino-1-naphthalenesulfonic acid (1,8-ANS), N-(5-aminopentyl)-5-(dimethylamino) naphthalene-1-sulfonamide (dansyl cadaverine); 2,3,5, 6-1H,4H-tetrahydro-9-carbethoxyquinolizino-[9,9a,1-gh]coumarin (commonly known as coumarin 314), 10-Acetyl-2,3,6,7-tetrahydro-1H,5H,11H-pyrano[2,3-f]pyrido[3,2,1-ij]quinolin-11-one (commonly known as coumarin 334), 11-Oxo-2,3,6,7-tetrahydro-1H,5H, 11H-pyrano[2,3-f]pyrido[3,2,1-ij]quinoline-10-carboxylic acid (commonly known as coumarin 343), quinine sulfate, 7-benzylamino-4-nitrobenz-2-oxa-1,3-diazole (BBD), and 7-fluoro-4-nitrobenz-2-oxa-1,3-diazole.

In another aspect of the present invention there is provided a method of determining the oxygen content of an atmosphere, the method comprising exposing the colorimetric oxygen sensor formulation described above to the atmosphere; applying a source of UV/UV-visible excitation to the formulation; and observing the colour of the formulation.

The atmosphere may be a food packaging atmosphere. Alternatively, the atmosphere may be any environment in which a vacuum or controlled oxygen concentration is preferred; such as in the packaging of pharmaceutical products, disposable medical products or electronic components; or in packaging or storage in the areas of conservation/preservation (e.g. artworks or antiquities etc.).

In a further aspect of the present invention there is provided a method of preparing a laminate film or label comprising a colorimetric oxygen sensor, wherein the method comprises printing the formulation described above onto a substrate film. The invention also relates to a laminate film or label comprising a printed colorimetric oxygen sensor, and to the use of such laminate films and labels in packaging applications.

Various further features and aspects of the invention are defined in the claims.

BRIEF DESCRIPTION OF THE DRAWINGS

Embodiments of the present invention will now be described by way of example only with reference to the accompanying drawings where like parts are provided with corresponding reference numerals and in which.

DETAILED DESCRIPTION

The present invention relates to a colorimetric oxygen sensor formulation comprising a first lumophore and a second lumophore dispersed in a polymer matrix, wherein:

(i) the first lumophore is platinum 5,10,15,20-tetrakis(2, 3,4,5,6-pentafluorophenyl)porphyrin (PtTFPP) and the second lumophore is 3-(2-benzothiazolyl)-7-(diethylamino) coumarin (C6);

(ii) the first lumophore is platinum 5,10,15,20-tetrakis(2, 3,4,5,6-pentafluorophenyl)porphyrin (PtTFPP) and the second lumophore is 2,3,6,7-tetrahydro-9-trifluoromethyl-1H,5H-quinolizino(9,1-gh) coumarin (C153);

(iii) the first lumophore is platinum octaethylporphyrin (PtOEP) and the second lumophore is 2,3,6,7-tetrahydro-9-trifluoromethyl-1H,5H-quinolizino(9,1-gh) coumarin (C153);

(iv) the first lumophore is platinum octaethylporphyrin (PtOEP) and the second lumophore is 7-benzylamino-4-nitrobenz-2-oxa-1,3-diazole (BBD);

(v) the first lumophore is platinum octaethylporphyrin (PtOEP) and the second lumophore is rhodamine 6G (R6G);

(vi) the first lumophore is ruthenium (II) 4,7-diphenyl-1, 10'-phenanthroline [Ru(dpp)$_3$]$^{2+}$ and the second lumophore is 3-(2-benzothiazolyl)-7-(diethylamino) coumarin (C6);

(vii) the first lumophore is ruthenium (II) 4,7-diphenyl-1,10'-phenanthroline [Ru(dpp)$_3$]$^{2+}$ and the second lumophore is 2,3,6,7-tetrahydro-9-trifluoromethyl-1H, 5H-quinolizino(9,1-gh) coumarin (C153);

(viii) the first lumophore is ruthenium (II) 4,7-diphenyl-1,10'-phenanthroline [Ru(dpp)$_3$]$^{2+}$ and the second lumophore is rhodamine 6G (R6G);

(ix) the first lumophore is platinum meso-tetraphenylporphyrin (PtTPP) and the second lumophore is 3-(2-benzothiazolyl)-7-(diethylamino) coumarin (C6);

(x) the first lumophore is platinum meso-tetraphenylporphyrin (PtTPP) and the second lumophore is 2,3,6,7-tetrahydro-9-trifluoromethyl-1H,5H-quinolizino(9,1-gh) coumarin (C153);

(xi) the first lumophore is platinum meso-tetraphenylporphyrin (PtTPP) and the second lumophore is 7-benzylamino-4-nitrobenz-2-oxa-1,3-diazole (BBD);

(xii) the first lumophore is platinum meso-tetraphenylporphyrin (PtTPP) and the second lumophore is rhodamine 6G (R6G);

(xiii) the first lumophore is palladium 5,10,15,20-tetrakis (2,3,4,5,6-pentafluorophenyl)porphyrin (PdTFPP) and the second lumophore is 3-(2-benzothiazolyl)-7-(diethylamino) coumarin (C6);

(xiv) the first lumophore is palladium 5,10,15,20-tetrakis (2,3,4,5,6-pentafluorophenyl)porphyrin (PdTFPP) and the second lumophore is 2,3,6,7-tetrahydro-9-trifluoromethyl-1H,5H-quinolizino(9,1-gh) coumarin (C153); Or wherein the first lumophore is selected from:

pyrene, erythrosine B; ruthenium (II) 1,10-phenanthroline ([Ru(phen)$_3$]2+), osmium (II) 1,10-phenanthroline ([Os(phen)$_3$]2+), ruthenium (II) 4,7-diphenyl-1,10'-phenanthroline ([Ru(dpp)$_3$]2+), osmium (II) 4,7-diphenyl-1,10'-phenanthroline ([Os(dpp)$_3$]2+), meso-tetraphenylporphyrin (TPP), platinum meso-tetraphenylporphyrin (PtTPP), platinum 5,10,15,20-tetrakis(4-carboxyphenyl)porphyrin (PtTCPP), platinum 5,10,15,20-tetrakis(2,3,4,5,6-pentafluorophenyl)porphyrin (PtTFPP), platinum coproporphyrin (PtCP), platinum coproporphyrin tetraethyl ester) (PtCPTEE), platinum meso-tetra(2,6-dichlorophenyl)porphyrin (PtTDCPP), platinum meso-tetra(3,5-bis(trifluoromethyl)phenyl)-porphyrin (PtTFMPP), platinum meso-tetrakis(4-N-methylpyridyl)porphyrin (PtTMPyP$^{4+}$), palladium meso-tetraphenyltetrabenzoporphyrin (PdTPTBP), palladium 5,10,15,20-tetrakis (4-carboxyphenyl)porphyrin) (PdTCPP), palladium meso-tetraphenylporphyrin (PdTPP), palladium 5,10, 15,20-tetrakis(2,3,4,5,6-pentafluorophenyl)porphyrin (PdTFPP)]; Or the second lumophore is selected from acriflavine (3,6-diamino-10-methylacridinium chloride 3,6-acridinediamine (1:1:1), proflavine (3,6-Acridinediamine), rhodamine 110 (3,6-diamino-9-(2-carboxyphenyl)xanthenium chloride), rhodamine green (5(6)-carboxyrhodamine 110), 5-carboxyfluorescein, eosin Y, 8-(phenylamino-1-naphthalenesulfonic acid (1,8-ANS), N-(5-aminopentyl)-5-(dimethylamino)naphthalene-1-sulfonamide (dansyl cadaverine); 2,3,5,6-1H, 4H-tetrahydro-9-carbethoxyquinolizino-[9,9a,1-gh] coumarin (commonly known as coumarin 314), 10-acetyl-2,3,6,7-tetrahydro-1H,5H,11H-pyrano[2,3-f] pyrido[3,2,1-ij]quinolin-11-one (commonly known as coumarin 334), 11-oxo-2,3,6,7-tetrahydro-1H,5H,11H-pyrano[2,3-f]pyrido[3,2,1-ij]quinoline-10-carboxylic acid (commonly known as coumarin 343), quinine sulfate, 7-benzylamino-4-nitrobenz-2-oxa-1,3-diazole (BBD) and 7-fluoro-4-nitrobenz-2-oxa-1,3-diazole.

Throughout this specification, the term "lumophore" is used synonymously with "luminophore" to mean a chemical species which spontaneously emits light upon radiative relaxation (luminescence) from a higher energy electronic excited state (unstable) to its lowest energy ground state (stable). The higher energy electronic state is formed when the lumophore absorbs radiation, which is usually, but not always, at an energy greater than that of the subsequently emitted light. The colorimetric sensor formulation is oxygen-sensitive, i.e. it exhibits an observable colour change in response to a change in the oxygen concentration of an atmosphere or local environment to which it is exposed.

The colorimetric sensor formulation is luminescence-based. The colour change arises due to preferential quenching of the light emitted by at least one of the lumophores in the formulation. The colour change is visible to the naked eye only when the formulation is exposed to UV light. This can have advantages in terms of monitoring consumer products, as the sensors can be concealed from general view, if preferred.

The colorimetric sensor formulation is an oxygen sensor formulation. Throughout this specification, "oxygen sensor" is intended to mean a single parameter sensor which is sensitive to oxygen as an analyte.

The first lumophore is an oxygen-sensitive lumophore, i.e. its emission is quenched, preferably significantly, in the presence of oxygen. The emission of the first lumophore is insensitive to pH and temperature. Suitable oxygen-sensitive lumophores for use as the first lumophore in the present invention include platinum octaethylporphyrin (PtOEP), ruthenium (II) 4,7-diphenyl-1,10'-phenanthroline ([Ru(dpp) $_3$]2+), platinum meso-tetraphenylporphyrin (PtTPP), pyrene, erythrosine B; ruthenium (II) 1,10-phenanthroline ([Ru(phen)$_3$]2+), osmium (II) 1,10-phenanthroline ([Os (phen)$_3$]2+), ruthenium (II) 4,7-diphenyl-1,10'-phenanthroline ([Ru(dpp)$_3$]2+), osmium (II) 4,7-diphenyl-1,10'-phenanthroline complex ([Os(dpp)$_3$]2+), meso-tetraphenylporphyrin (TPP), platinum meso-tetraphenylporphyrin (PtTPP), platinum 5,10,15,20-tetrakis (4-carboxyphenyl)porphyrin (PtTCPP), platinum 5,10,15, 20-tetrakis(2,3,4,5,6-pentafluorophenyl)porphyrin (PtTFPP), platinum coproporphyrin (PtCP), platinum coproporphyrin tetraethyl ester) (PtCPTEE), platinum meso-tetra(2,6-dichlorophenyl)porphyrin (PtTDCPP), platinum meso-tetra(3,5-bis(trifluoromethyl)phenyl)-porphyrin (PtTFMPP), platinum meso-tetrakis(4-N-methylpyridyl) porphyrin (PtTMPyP$^{4+}$), palladium meso-tetraphenyltetrabenzoporphyrin (PdTPTBP), palladium 5,10,15,20-tetrakis (4-carboxyphenyl)porphyrin) (PdTCPP), and palladium meso-tetraphenylporphyrin (PdTPP).

In an embodiment, the first lumophore is selected from PtOEP, [Ru(dpp)$_3$]2+, PtTPP, ruthenium (II) 2,2'-bipyridine ([Ru(bpy)$_3$]2+), PtTFPP and PdTFPP.

The second lumophore is an oxygen-insensitive lumophore, i.e. its emission is not quenched significantly in the presence of oxygen. The second lumophore typically absorbs UV and/or UV-visible light substantially in the same spectral region as the first lumophore. This is advantageous as it allows a single excitation source to be used. However, if the first and second lumophores do not absorb in substantially the same spectral region, multiple excitation sources can be used. The second lumophore emits substantially in a different spectral region to the first lumophore. By 'substantially' it is meant that the maximum emission of each lumophore should differ by at least~ 20 nm in order to allow a colour change to be observed. The emission of the second lumophore is also insensitive to pH and temperature.

In an embodiment, the second lumophore is selected from coumarin 6, coumarin 153, rhodamine 6G, 7-benzylamino-4-nitrobenz-2-oxa-1,3-diazole (BBD), and quinine sulphate.

The sensor formulation changes colour in response to a change in the oxygen concentration in an atmosphere or local environment to which it is exposed due to a preferential and quantitative reduction (quenching) in the luminescence of the oxygen-sensitive lumophore.

Advantageously, the colour change is reversible, enabling colour changes to proceed in the forward and reverse directions of the response range in line with an increase or decrease in the local oxygen concentration. This affords the sensor formulation broad applicability for commercial applications.

In embodiments of the invention, the first lumophore is a red-emissive lumophore and the second lumophore is a blue-emissive, green-emissive or orange-emissive lumophore.

Suitable examples include PtTFPP (red-emissive) as the first lumophore and coumarin 6 (green-emissive) as the second lumophore; PtTFPP (red-emissive) as the first lumophore and 2,3,6,7-tetrahydro-9-trifluoromethyl-1H,5H-quinolizino(9,1-gh) coumarin (coumarin 153, C153)(blue/green-emissive) as the second lumophore; PtOEP (red-emissive) as the first lumophore and 2,3,6,7-tetrahydro-9-trifluoromethyl-1H,5H-quinolizino(9,1-gh) coumarin (coumarin 153, C153)(blue/green-emissive) as the second lumophore; PtOEP (red-emissive) as the first lumophore and 7-benzylamino-4-nitrobenz-2-oxa-1,3-diazole (BBD) (green-emissive) as the second lumophore; PtOEP (red-emissive) as the first lumophore and rhodamine 6G (orange-emissive) as the second lumophore; $[Ru(dpp)_3]^{2+}$ (orange-red emissive) as the first lumophore and coumarin 6 (green-emissive) as the second lumophore; $[Ru(dpp)_3]^{2+}$ (orange-red emissive) as the first lumophore and coumarin 153 (blue/green-emissive) as the second lumophore; $[Ru(dpp)_3]^{2+}$ (orange-red emissive) as the first lumophore and rhodamine 6G (orange-emissive) as the second lumophore; platinum meso-tetraphenylporphyrin (PtTPP) (red-emissive) as the first lumophore and coumarin 6 (green-emissive) as the second lumophore; platinum meso-tetraphenylporphyrin (PtTPP) (red-emissive) as the first lumophore and coumarin 153 (blue/green emissive) as the second lumophore; platinum meso-tetraphenylporphyrin (PtTPP) (red-emissive) as the first lumophore and BBD (green-emissive) as the second lumophore; platinum meso-tetraphenylporphyrin (PtTPP) (red-emissive) as the first lumophore and rhodamine 6G (orange-emissive) as the second lumophore; PdTFPP (red-emissive) as the first lumophore and coumarin 6 (green-emissive) as the second lumophore; PdTFPP (red-emissive) as the first lumophore and 2,3,6,7-tetrahydro-9-trifluoromethyl-1H,5H-quinolizino(9,1-gh) coumarin (coumarin 153, C153)(blue/green-emissive) as the second lumophore; $[Ru(dpp)_3]^{2+}$ (orange-red emissive) as the first lumophore and 7-benzylamino-4-nitrobenz-2-oxa-1,3-diazole (BBD) (green-emissive) as the second lumophore; PtTFPP (red-emissive) as the first lumophore and 7-benzylamino-4-nitrobenz-2-oxa-1,3-diazole (BBD) (green-emissive) as the second lumophore; PdTFPP (red-emissive) as the first lumophore and 7-benzylamino-4-nitrobenz-2-oxa-1,3-diazole (BBD) (green-emissive) as the second lumophore.

In an embodiment of the invention, the first lumophore is $[Ru(dpp)_3]^{2+}$ and the second lumophore is C153. When the first lumophore is $[Ru(dpp)_3]^{2+}$ and the second lumophore is C153, the ratio of the first lumophore (i.e. lumophore 1) to the second lumophore, (i.e. lumophore 2) may, in certain embodiments, be from 0.6:1 to 1:1.

In an embodiment of the invention the first lumophore is PtTFPP and the second lumophore is C6. When the first lumophore is PtTFPP and the second lumophore is C6, the ratio of the first lumophore (i.e. lumophore 1) to the second lumophore (i.e. lumophore 2) may, in certain embodiments, be from 1:1 to 0.5:1.

The lumophore pair can be selected in order to exhibit a colour change in the oxygen concentration range of interest, as set out in more detail below. This allows the colorimetric sensor to be tuned to the application of interest.

The emission of each of the lumophores is typically insensitive to pH and temperature, allowing the sensor formulation to be applied directly in a wide variety of environments and ensuring that the colorimetric change is directly attributable to the change in oxygen concentration.

The first lumophore and the second lumophore are included within the polymer matrix at a defined stoichiometric ratio. In an embodiment, the ratio of lumophore 1:lumophore 2 is from 1:4 to 2:1.

In an embodiment of the invention, the formulation additionally comprises a third lumophore. Including a third lumophore allows the colour response to be tuned further. For instance, when the sensor formulation comprises two lumophores with partially overlapping emissions in the same region, the emission colour can be maintained over a broader range of $O_2$ concentrations, meaning that the colour change appears only at narrower $O_2$ concentrations ranges. This can allow the sensor to be more specifically targeted to $O_2$ concentration ranges of interest.

The inclusion of a third (or further) lumophore can also allow a lumophore to act as a light harvester, i.e. to strongly absorb UV and/or UV-visible light and then transfer the excess energy radiatively or non-radiatively towards one or both of the other lumophores.

In an embodiment in which a third lumophore is included in the sensor formulation, the stoichiometric ratio of lumophore 1:lumophore 2:lumophore 3 can be in the range of from 1:2-3:6-20.

In the colorimetric formulation of the invention the at least two lumophores are dispersed in a polymer matrix. In the colorimetric formulation of the invention, the lumophores are dispersed directly in the polymer matrix and are not encapsulated or otherwise embedded (e.g. in a gel) before dispersion in the polymer matrix. The lumophores are not incorporated on the surface of microbeads. The lumophores are not incorporated within mesoporous structures. Thus, when incorporated into a sensor label or laminate film, for instance, the lumophores are dispersed in a single lumophore-polymer layer. Advantageously, this configuration eliminates problems with irreproducibility associated with preparing multilayer coatings in which the lumophores are dispersed in separate polymer layers, which can arise from a number of factors such as emission quenching, energy transfer and redissolution of previously cast layers. Thus, at least two lumophores are preferably homogeneously dispersed in the polymer matrix.

The polymer may be selected from polystyrenes, polyvinyls, polyamides, polyurethanes, acrylates, shellac, rosin, rosin esters, celluloses and cellulose-derivatives; and mixtures thereof.

The polymer may be, for example, a cellulose-based polymer or polymers. Suitable cellulose-based polymers include but are not limited to ethyl cellulose (EC), cellulose acetate (CA), cellulose acetate propionate (CAP), cellulose acetate butyrate (CAB), nitrocellulose (NC), hydroxypropyl cellulose (HPC), hydroxypropyl methyl cellulose (HPMC) or carboxymethyl cellulose (CMC).

In an embodiment, the polymer is one or more of EC, CAP or CAB.

The colorimetric formulation may be in the form of an ink, and specifically a printable ink.

Throughout this specification, the term "ink" means a fluid or viscous substance that can be printed using a suitable printing technique. Suitable printing techniques include, for instance, inkjet printing such as piezo-based inkjet or thermal inkjet, flexographic printing, gravure printing, offset lithography, screen-printing and letterpress. In an embodiment, the printing is performed by inkjet printing, flexographic printing or gravure printing.

The ink may consist of the first lumophore and second lumophore dispersed in a polymer matrix, optionally along with any solvents used in the preparation process. Alternatively, the ink may comprise further lumophores and/or additional components. Thus, the polymer and any solvents act as vehicles for the lumophores to facilitate printing.

The ink formulation may additionally comprise one or more printing additives. Such additives include, for instance, rheology modifiers, dispersants, wetting agents, plasticisers etc., as would be well known to a person skilled in the art.

The rheological properties of the ink may be controlled to ensure compatibility with the printing process used, i.e. to enable high-throughput of printing and to minimise ink bleed and, in the case of inkjet printing, to minimise nozzle blockages. For flexographic and gravure printing the viscosity of the ink is typically controlled within a range of from 20-80 mPa·s, whereas for inkjet printing the viscosity of the ink is typically controlled within a range of from 2-10 mPa·s. Further properties of the ink formulation can be controlled in order to obtain formulations showing Reynolds (Re), Weber (We) and Ohnesorge ($Oh=We^{1/2}/Re$) numbers that are in a suitable range to ensure ideal drop formulation and continuous jetting ($50 \leq Re \leq 500$; $20 \leq We \leq 300$; $0.1 \leq Oh \leq 1$) and to prevent clogging of the nozzle and the "skinning" effect, each of these phenomena leading to poor quality printing and/or jetting interruption.

The invention also relates to a method of determining the oxygen content of an atmosphere. This method comprises the steps of exposing the colorimetric sensor formulation described above to the atmosphere; applying a source of UV or UV-visible excitation to the formulation; and observing the colour of the formulation.

As would be generally understood by a skilled person, the UV region is from 190 nm to 400 nm and the visible region is from 400 nm to 700 nm.

In an embodiment, the excitation wavelength is from 340 nm to 465 nm.

Advantageously, the colour change is visible to the naked eye only upon the application of a UV/UV-visible light source to the formulation. This means that the sensor formulation can be concealed within food packaging, for example, which can be beneficial when supplying consumer products.

As another advantage, the colour change takes place very rapidly, and typically within seconds of exposure to the MAP. This allows the sensor formulation to be used for real-time monitoring.

The colour of the formulation can be compared with a reference colour to determine the oxygen content. For instance, the colour of the formulation can be visibly observed and compared with a calibrated colour chart for the specific sensor formulation, which can give a rapid, semi-quantitative result about the oxygen concentration in the atmosphere.

Alternatively, fully quantitative analysis can be achieved using fluorescence spectroscopy.

The invention also relates to automated methods of assessing the oxygen concentration of an atmosphere using the sensor formulation described above. For example, in an embodiment of the invention, a camera can be used to obtain a digital image of the colour signature of the sensor formulation. The digital image can then be processed, and the colour converted into a numerical value, which can be automatically correlated with a pre-calibrated colour chart, to yield an oxygen content value. The software can be designed to locate the sensor (for example on the packaging of a product or food product), and to identify and eliminate optical variations (e.g. reflections, scattering etc.) in the image before the image is processed against the empirical calibration file for the specific sensor formulation and attributed an oxygen percentage. This approach can enable real-time, high throughput and remote analysis of multiple samples, for instance each packaged product on an assembly line. The oxygen percentage determined following this approach can then be used to eliminate packages which fall outside the prescribed specifications. For instance, the assembly line can incorporate a linked rejection mechanism which can remove such eliminated packages from the line, thereby preventing these products from moving down the supply chain.

Advantageously, the sensor formulation of the present invention allows a colour change to be observed visually, i.e. the colour change is visible to the naked eye once exposed to UV/UV-visible light. This negates the need for expensive external detection equipment (such as a spectrometer) and also allows the detection to be performed by a lay person (i.e. no specific technical skills required). A further advantage is that the detection can be performed using standard vision systems. In many cases, these are already present in production lines, for instance for use in label inspection, damage inspection, product colour etc., thereby avoiding the need in these cases to install expensive detection systems. Comparison of the colour with a database of calibration curves or colour charts, specific to the lumophore pair (or lumophore trio etc.) being used, allows a quantitative determination to be made.

However, the colour change can be monitored via spectrometry, if required, and a full quantitative analysis performed. Embodiments of the invention also relate to electronic means of detecting the colour change, i.e. via the use of software, which may be coded into an "app", and which can detect the colour of the atmosphere and compare it with a pre-programmed database, to yield a result on the freshness or safety of the packaged item or the packaging integrity. Such a result can be binary (i.e. fresh=yes/no; safe=yes/no) or it can be a quantitative value, indicating the degree of freshness of the packaged product (for example to indicate to a seller to "maintain stock as normal", "reduce the product price", "discard product", etc.).

As indicated above, the sensor is particularly suitable for use in the context of food packaging atmospheres, although it is not specifically limited thereto, and it may find applicability in other areas in which oxygen concentrations are monitored, such as in pharmaceutical storage, packaging of disposable sterile medical products, conservation of artworks and cultural works or packaging of electronic components. For all of these applications an oxygen-free or controlled oxygen environment may be favoured (i.e. 0% $O_2$). In addition, the luminescent-based colorimetric sensor formulations of the invention could find application in the monitoring of gas supply products, such as in pre-mixed gas cylinders, where controlled oxygen concentrations (~0-100%) are required.

As noted above, the colorimetric sensor can be tuned to the application of interest, i.e. by controlling the lumophore selection, a colorimetric response can be obtained within the $O_2$ concentration ranges of interest. In an embodiment, the colorimetric sensor formulation is configured to provide a colour change across $O_2$ concentration ranges of from 0-20% (applicable to fruit, vegetables and oxygen-sensitive foodstuffs such as cooked meats, nuts, fish and cheese) or from 20-80% (applicable to meat products and other foodstuffs requiring high $O_2$ MAP). Other defined concentrations ranges can be tailored based on the application of interest.

According to an aspect of the invention there is provided a method of preparing a laminate film or label comprising a colorimetric sensor, the method comprising printing the sensor formulation onto a substrate film. In an embodiment, the substrate film is a polymer substrate film.

The substrate film may itself be a laminate film and may comprise a plurality of layers or may be a mono-layer film which is printed with the sensor formulation to form a sensor-printed laminate or mono-layer film.

The polymer substrate may be subjected to surface treatment prior to printing in order to improve the wettability of the sensor ink on the film. Such surface treatment steps include, for example, corona discharge, flame activation, low-pressure oxygen plasma, laser beam, focused ion beam or electron beam processing, as well as chemical treatment via the application of an organic or inorganic coating.

The integration of the sensor ink formulation into packaging material is a key component of the invention and allows the sensor to be provided within the controlled atmosphere packaging for in-situ detection and/or monitoring of oxygen concentration within the controlled or modified atmosphere. Accordingly, the polymer substrate should be compatible with conventional/commercially-available laminate polymer films used to seal the trays of MAP foodstuffs, or with the plastic film coatings typically applied to vacuum-packed food trays or to packaging of electronic/medical products. The sensor may be printed onto either side of the laminate polymer film or plastic film coating.

The polymer substrate film may be a layer of a laminate film. In an embodiment, the polymer substrate film has a high $O_2$ transmission rate. Suitable examples include, but are not limited to, polyethylene (PE), polypropylene (PP), polystyrene (PS) and polycarbonate (PC).

Alternatively, the sensor ink formulation can be reverse-printed onto a polymer film substrate that has a low or very low $O_2$ transmission rate. Suitable polymer film substrates having low or very low $O_2$ transmission rates include polyamide (PA), which includes the likes of nylon, cast nylon etc., polyvinylidene chloride (PVDC), polyester (PET), and oriented polyester (OPET). A low or very low $O_2$ transmission layer can retain the modified atmosphere within the packaging.

Once a polymer substrate film with a high $O_2$ transmission rate has been printed with the sensor ink formulation, the printed polymer substrate film is subsequently adhered to a lidding film, which is preferably a gas impermeable film such as PA or PET, so that the sensor ink is entrapped between the polymer substrate film and the lidding film. The polymer substrate film can be adhered to the lidding film using a suitable adhesive, such as a two-component acrylic-based adhesive or polyurethane adhesive that can bond low surface energy plastic, but this is not particularly limited once the adhesive serves to adhere the surfaces and is compatible for use with foodstuffs. The adhesive can be deposited around the edges of the layers to be laminated to affix it in place, i.e. it does not cover the printed sensor nor the majority of the interface between layer 1 and layer 2. Alternatively, the adhesive can be applied across the layer, i.e. covering the printed sensor and the polymer substrate film. In this case the adhesive must be a gas permeable adhesive.

Optionally, the printed polymer substrate film may be further held in place or supported by an additional polymer layer.

Suitable commercial lidding films with which this technique can be used include, for instance, polyamide (PA)/polyethylene (PE) films, polyester (PET)/polyethylene (PE) films, polyester (PET)/ethylene vinyl alcohol(EVOH)/polyethylene (PE) films, polypropylene (PP)/ethylene vinyl alcohol(EVOH)/polyethylene (PE) films and polypropylene (PP)/polyamide(PA)/polyethylene (PE) films.

Figure 1:
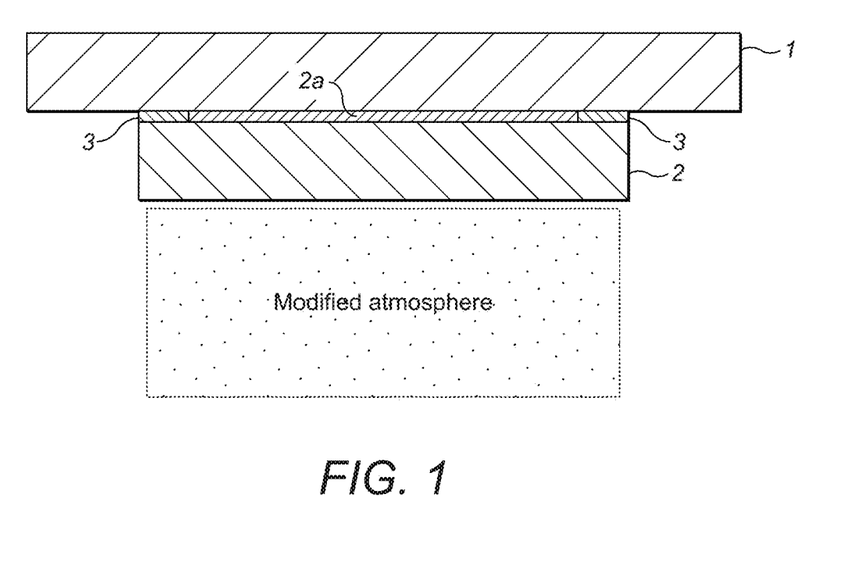
FIG. 1 illustrates a method of preparing a laminate lidding film comprising an embedded colorimetric oxygen sensor.

This process is shown schematically in FIG. 1, which illustrates a commercially-available gas-impermeable lidding film (1) to which a printed polymer substrate film (2) has been applied, face-in, i.e. so that the printed sensor (2a) is entrapped between the lidding film (1) and the polymer substrate film (2). In the embodiment shown, the printed polymer substrate film (2) is adhered to film (1) using a layer of adhesive (3) deposited around the edges of the layer.

Alternatively, once the polymer substrate film (having either high $O_2$ or low $O_2$ transmission rate) has been printed with the sensor ink formulation, the printed polymer substrate film is then laminated with a second polymer layer such that the sensor ink is entrapped between the layers. The laminate structure can then be applied as needed to modified atmosphere packaging, for example by heat sealing. In an embodiment, the second polymer layer has complementary $O_2$ transmission characteristics to the printed polymer substrate film (i.e. an $O_2$ permeable layer/high $O_2$ transmission rate polymer is paired with an $O_2$ barrier layer/low $O_2$ transmission rate and vice versa if reverse printing has been performed). In situ, the high transmission rate polymer layer is positioned next to the modified atmosphere, with the gas impermeable layer acting as a barrier to prevent $O_2$ exchange between the inside of the packaging (i.e. the modified atmosphere) and the outside (i.e. the atmospheric conditions outside the packaging). The lamination step may include the application of a thin layer of adhesive (solvent-based or solvent free) to one of the laminate-forming layers (in an embodiment, the non-sensor-printed one). The laminate is then kept at room temperature (~20° C.) for 8-30 days to allow full curing of the adhesive. Typically, a range of from 14-21 days is preferred, to ensure full curing and to limit the possibility of any components of the adhesive or the solvents migrating into the food products. In an embodiment, curing time can be accelerated if the laminate is kept in a heated environment (e.g. if the laminate is kept at a temperature of ~35-50° C., curing time can be reduced to a range of from 5-7 days).

Alternatively, the lamination step may be performed via the application of heat treatment instead of, or alongside, the use of an adhesive.

In an embodiment of the invention, the sensor formulation is printed onto a gas permeable substrate to form a label. The label may be self-adhesive or may be attached using an adhesive (for example to the underside of an appropriate lidding film). The substrate may be, for example, a clear PE or PP label.

In an embodiment of the invention, a label printed with a sensor formulation according to the invention may be incorporated on the inside of product packaging, e.g. under a commercial lidding film, and applied, for example, using an industrial label applicator.

The invention also relates to a laminate or multi-laminate film prepared according to the method described above, the film comprising a colorimetric oxygen sensor.

In an embodiment, the invention relates to a laminate film comprising a colorimetric oxygen sensor as described in detail above.

Advantageously, the sensor formulation is not visible to the naked eye when printed onto laminate films or labels. This means that integrated or embedded sensors, used for the purposes of monitoring the integrity of packaging on an assembly line, for example, are not visible to consumers.

The present invention also relates to a system for monitoring the oxygen content in controlled atmosphere packaging. The system may comprise a laminate packaging film or label comprising a colorimetric oxygen sensor as described in detail above, a UV or UV-visible light source, and an image reader.

The invention will now be described by way of reference to the following examples, which are intended to be illustrative only.

EXAMPLES

Example 1: Preparation of Sensor Formulations 1.1 Platinum(II) octaethylporphyrin: 2,3,6,7-tetrahydro-9-trifluoromethyl-1H,5H-quinolizino(9,1-gh) coumarin PtOEP:C153 (1:1 stoichiometric ratio)

10 g of dry ethyl cellulose polymer was added to an 80:20 (v/v) mixture of toluene:ethanol (84.7 ml toluene; 21.2 ml ethanol) and stirred overnight to ensure full dissolution of the polymer. 36.90 mg of platinum(II) octaethylporphyrin (PtOEP, Lumophore 1) and 14.97 mg of 2,3,6,7-tetrahydro-9-trifluoromethyl-1H,5H-quinolizino(9,1-gh) coumarin (C153, Lumophore 2), were then added sequentially to the solution in powder form and the solution stirred until complete homogenisation was achieved and no sedimentation of the lumophores was observed. The colour change response of the sensor formulation was then measured as outlined in Example 2 below.

Although the lumophores were added to the solution in the form of dry powder in the protocol above, the lumophores can alternatively be dissolved in solvent (tetrahydrofuran, toluene or ethanol for PtOEP, [Ru(dpp)$_3$]$^{2+}$, [Ru(bpy)$_3$]$^{2+}$, PtTFPP and PdTFPP, tetrahydrofuran or ethanol for C6, C153, R6G and BBD) prior to the addition to the polymer solution by micropipette. In this embodiment, the high lumophore concentrations (>2 mM) in the solutions ensures that no further or minimal (≤2%) dilution of the polymer solution occurs. This preparation method is suitable for formulations of a total weight≤20 g.

1.2 Further Formulations

Further formulations comprising PtTFPP:C6 (1:1 stoichiometric ratio); PtTFPP:BBD (1:3 stoichiometric ratio); PtOEP:C153 (1.25:1 stoichiometric ratio); PtOEP:BBD (1:3 stoichiometric ratio); [Ru(dpp)$_3$]$^{2+}$:C153 (1:1); [Ru(dpp)$_3$]$^{2+}$:BBD (1:3 stoichiometric ratio); PdTFPP:BBD (1:1 stoichiometric ratio); PtTPP:C6 (1:1 stoichiometric ratio) and PtOEP:R6G (1:1) were prepared using the methodology described in Example 1.1. Additionally, a formulation comprising two red-emitting oxygen-sensitive lumophores, PtOEP and a ruthenium(II) 2,2'-bipyridine complex [Ru(bpy)$_3$]$^{2+}$; and a single green-emitting oxygen-insensitive lumophore, C6, was prepared following the procedure outlined above, with the lumophores being mixed in a ratio of 1:3:6 (PtOEP:C6:[Ru(bpy)$_3$]$^{2+}$)

1.3 Platinum(II) octaethylporphyrin: 2,3,6,7-tetrahydro-9-trifluoromethyl-1H,5H-quinolizino(9,1-gh) coumarin PtOEP: C153 (1:1 stoichiometric ratio) in cellulose acetate propionate (CAP) and in cellulose acetate butyrate (CAB)

In order to assess the effect of the polymer matrix on the sensor response, a PtOEP:C153 (1:1) sensor formulation was prepared in CAP and in CAB, following the procedure outlined in Example 1.1 adjusted for 1 g polymer.

Example 2: Measurement of Colour Response

The colour response of the sensor formulation to changes in oxygen concentration was determined as follows:

Sensors were prepared by spin-coating the different formulations onto pre-cut glass slides. The measured thickness of the coated layer was between 1.1 and 1.6 µm. The sensor-coated glass was then placed in a disposable poly (methyl methacrylate) (PMMA) cuvette or cell under a controlled gas atmosphere. A Teflon-based sample holder was used to hold the sensor-coated glass in the 365 nm LED excitation light path at a fixed angle of 45°, thus ensuring that the sample position was the same for each sensor measured. The modification of the atmosphere within the cuvette was achieved by mixing $O_2$ and $N_2$ gases at the required ratios (0-100% $O_2$, which corresponds to 100-0% $N_2$) using a computer-controlled gas blender. Two holes on the top of the sample holder allowed for the gas mix IN flow and OUT flow. Photographs were taken using a compact digital camera with an exposure time of 1-4 s and attached to a tripod to eliminate blur.

Figure 2:
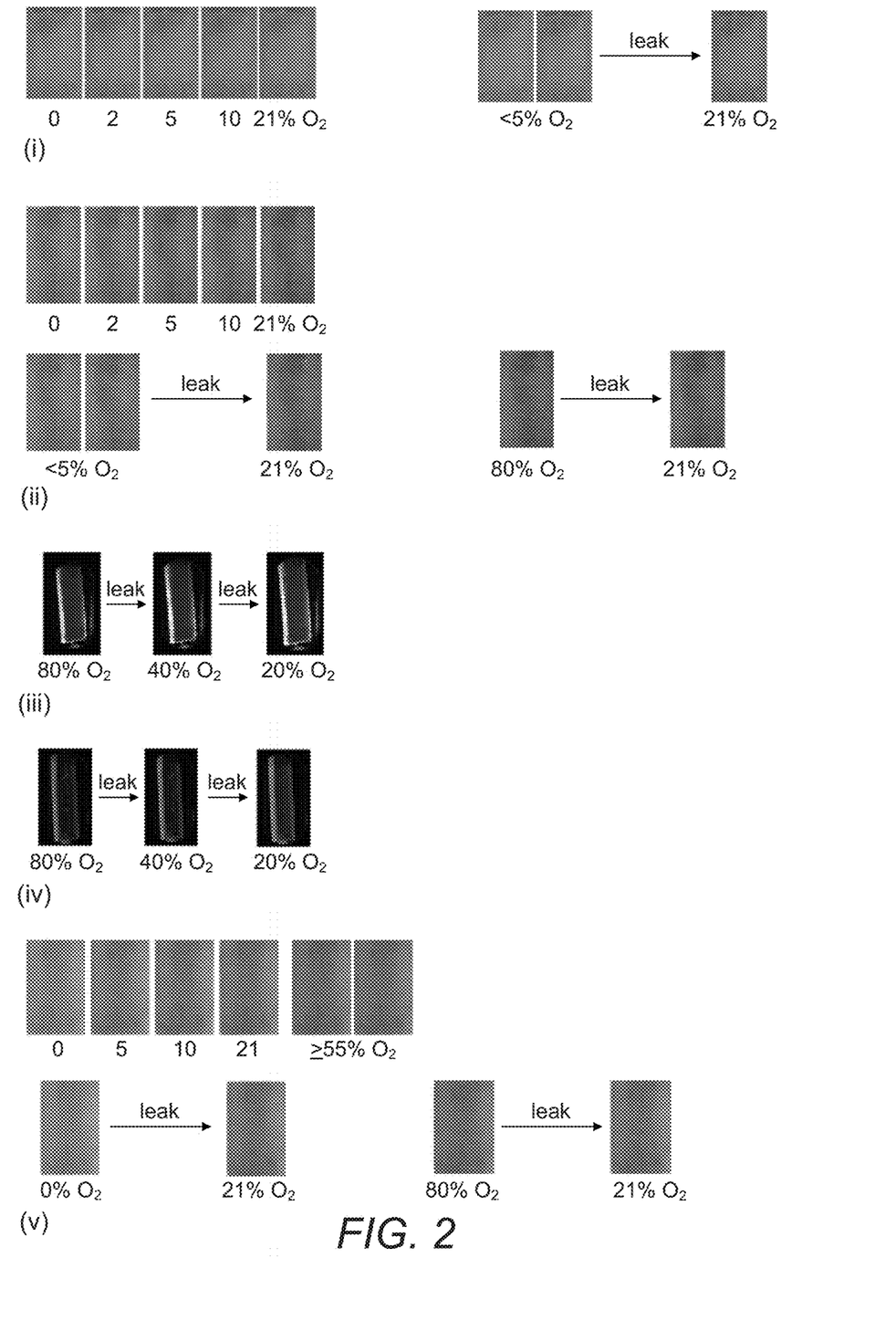
FIG. 2 shows colour response of sensor formulations for (i) PtTFPP:C6 (1:1); (ii) PtTFPP:BBD (1:3); (iii) PtOEP: C153 (1:1); (iv) PtOEP:C153 (1.25:1), (v) PtOEP:BBD (1:3); (vi) [Ru(dpp)$_3$]2+:C153 (1:1); (vii) [Ru(dpp)$_3$]2+: BBD (1:3); and (viii) PtOEP:C6:[Ru(bpy)$_3$]$^{2+}$ (1:3:6).

The results of these measurements are shown in FIG. 2, respectively (i) PtTFPP:C6 (1:1); (ii) PtTFPP:BBD (1:3); (iii) PtOEP:C153 (1:1); (iv) PtOEP:C153 (1.25:1), (v) PtOEP:BBD (1:3), (vi) [Ru(dpp)$_3$]$^{2+}$:C153 (1:1), (vii) [Ru(dpp)$_3$]2+:BBD (1:3); and (viii) PtOEP:C6:[Ru(bpy)$_3$]$^{2+}$ (1:3:6).

From these results it was determined that the first lumophore pair PtTFPP:C6 (1:1) produces a reddish pink to green colour change in a modified atmosphere containing 0-21% $O_2$ at room temperature. A significant mauve to green colour change, visible to the naked eye was observed between 2 to 10%, which identifies this particular sensor as a candidate for MAP of fresh fruit and vegetables which are usually packed under modified atmospheres with ≤5% $O_2$.

The PtTFPP:BBD (1:3) sensor formulation produces a four stage colour change from reddish orange to yellow to pear to green in modified atmospheres containing 0-80% $O_2$ at room temperature. Noticeable colour changes visible to the naked eye can be observed at low PO$_2$ (e.g. between 0-5% (reddish orange to salmon); and between 5-21% (salmon to pear green), which renders this particular lumophore combination suitable as packaging integrity indicators in vacuum-packed products (i.e. 0% $O_2$) as well as for fresh produce.

The PtOEP:C153 (1:1) sensor formulation produces a red-purple-violet-blue colour change in modified atmospheres containing 0-80% $O_2$ at room temperature. A noticeable colour change from purple to blue is observed between 20 and 80% $O_2$. This oxygen range is relevant to MAP for products such as raw meat (e.g. beef) which is packed under a $O_2$-rich atmosphere (70-80% $O_2$) in order to retain its appetizing colour for the consumers.

The PtOEP:C153 (1.25:1) formulation exhibits a red-purple-blue colour change at 20, 40 and 80% $O_2$. This formulation is advantageous due to its rapid response, enabling visual detection of potential leaks in MAP in a shorter period of time compared to other formulations.

The PtOEP:BBD (1:3) sensor formulation exhibits a red to orange colour change between 0-10% $O_2$, before turning yellow at atmospheric level (21% $O_2$) and then green at higher $pO_2$ (>21%). This oxygen range is relevant to integrity monitoring for fresh produce or oxygen-sensitive MAP foodstuff, such as sausages.

The PtOEP:C6:[Ru(bpy)$_3$]$^{2+}$ (1:3:6) sensor formulation produces a red-orange-pale yellow-green colour change in a modified atmosphere containing 0-80% $O_2$ at room temperature. A significant red-to-orange colour change visible to the naked eye can be observed between 0 and 5% $O_2$, before changing colour again to a pale yellow with some tint of green at 21% $O_2$. The colour change is then completed by increasing the level of oxygen to 80%, where the sensor appears green. The range of colour changes possibly identifies this particular sensor formulation as a potential candidate for MAP of food products packed under no or low $O_2$ containing atmosphere, as well as for MAP of food products, where high levels of $O_2$ are required within the package, such as fresh raw meat products.

The [Ru(dpp)$_3$]$^{2+}$:C153 (1:1) sensor formulation produces a pale orange to bluish-grey colour change for modified atmospheres containing 0-80% $O_2$ at room temperature. The lower sensitivity of [Ru(dpp)$_3$]$^{2+}$ to oxygen can be used to prepare formulations suitable for MAP of food products where high levels of $O_2$ are required in the packaging, such as fresh raw meat products.

The [Ru(dpp)$_3$]$^{2+}$: BBD (1:3) sensor formulation produces a bright orange to yellow colour change between 0-21% $O_2$. At higher $PO_2$, the colour changes to a pale greenish yellow. This oxygen range is relevant to integrity monitoring for vacuum-packed products (0-20% $O_2$) or oxygen-sensitive MAP foodstuff.

The PdTFPP:BBD (1:1) sensor formulation exhibits a colour change from a faint red to a pale yellow. Despite the relative low brightness of the colour change, the formulation is highly sensitive to oxygen and responds to levels of oxygen as low as 1-2%. The high sensitivity is particularly suited for both oxygen-sensitive vacuum-packed products and MAP foodstuffs, such as cooked meats.

The PtTPP:C6 (1:1) sensor formulation exhibits a bright orange to green colour change between 0-20% $O_2$. The three colour transition from orange to yellow to green in this particular oxygen range is relevant to integrity monitoring of vacuum-packed products (0 to 20% $O_2$), oxygen-sensitive MAP foodstuffs, as well as MAP of fresh produce.

The PtOEP:R6G (1:1) sensor formulation exhibits a bright red to dark orange colour change between 0-20% $O_2$, before the orange colour turns paler. This oxygen range is relevant to integrity monitoring for vacuum-packed products (0-20% $O_2$) or oxygen-sensitive MAP foodstuff.

The PtOEP:C153 (1:1) CAP sensor formulation produces a red-pink-purple-violet colour change for modified atmospheres containing 0-80% $O_2$ at room temperature, and the PtOEP:C153 (1:1) CAB sensor formulation produces a pink-purple-violet-turquoise colour under the same conditions (not shown). A noticeable colour change is observed between 20 and 80% $O_2$ for both formulations. These results are summarised in Table 1 below:

TABLE 1

| | | | | | $O_2$ concentrations at which colour change observed | | |
|---|---|---|---|---|---|---|---|
| Lumophore 1 (L1) | Lumophore 2 (L2) | Lumophore 3 (L3) | Polymer Matrix | Ratio L1:L2:L3 | $O_2$ concentration range where visible colour change observed | Relevant Food Sector | Other potential areas of application |
| PtTFPP | C6 | n/a | EC | 1:1 | 0-20% | Fruits, vegetables and other oxygen-sensitive foodstuffs (nuts, fish, cheese) requiring no or low $O_2$ MAP | Pharmaceutical storage, packaging of disposable sterile medical products, packaging of electronic components, all requiring no or low $O_2$ |
| PtTFPP | BBD | n/a | EC | 1:3 | 0-20% | Meat products (beef, poultry) or other foodstuffs requiring high $O_2$ MAP packaging | Pre-mixed gas cylinders, $O_2$ therapy/patient care |
| PtOEP | C153 | n/a | EC | 1:1 | 0-20% | Fruits, vegetables and other oxygen-sensitive foodstuffs (nuts, fish, cheese) requiring no or low $O_2$ MAP | Pharmaceutical storage, packaging of disposable sterile medical products, packaging of electronic components, all requiring no or low $O_2$ |
| | | | | | 20-80% | Meat products (beef, poultry) or other foodstuffs | Pre-mixed gas cylinders, $O_2$ therapy/patient |

TABLE 1-continued

O$_2$ concentrations at which colour change observed

| Lumophore 1 (L1) | Lumophore 2 (L2) | Lumophore 3 (L3) | Polymer Matrix | Ratio L1:L2:L3 | O$_2$ concentration range where visible colour change observed | Relevant Food Sector | Other potential areas of application |
| --- | --- | --- | --- | --- | --- | --- | --- |
| PtOEP | C153 | n/a | EC | 1.25:1 | 0-20% | requiring high O$_2$ MAP packaging Fruits, vegetables and other oxygen-sensitive foodstuffs (nuts, fish, cheese) requiring no or low O$_2$ MAP | care Pharmaceutical storage, packaging of disposable sterile medical products, packaging of electronic components, all requiring no or low O$_2$ |
|  |  |  |  |  | 20-80% | Meat products (beef, poultry) or other foodstuffs requiring high O$_2$ MAP packaging | Pre-mixed gas cylinders, O$_2$ therapy/patient care |
| PtOEP | BBD | n/a | EC | 1:3 | 0-20% | Fruits, vegetables and other oxygen-sensitive foodstuffs (nuts, fish, cheese) requiring no or low O$_2$ MAP | Pharmaceutical storage, packaging of disposable sterile medical products, packaging of electronic components, all requiring no or low O$_2$ |
|  |  |  |  |  | 20-80% | Meat products (beef, poultry) or other foodstuffs requiring high O$_2$ MAP packaging | Pre-mixed gas cylinders, O$_2$ therapy/patient care |
| PtOEP | C6 | [Ru(bpy)$_3$]$^{2+}$ | EC | 1:3:6 | 0-20% | Fruits, vegetables and other oxygen-sensitive foodstuffs (nuts, fish, cheese) requiring no or low O$_2$ MAP | Pharmaceutical storage, packaging of disposable sterile medical products, packaging of electronic components, all requiring no or low O$_2$ |
|  |  |  |  |  | 20-80% | Meat products (beef, poultry) or other foodstuffs requiring high O$_2$ MAP packaging | Pre-mixed gas cylinders, O$_2$ therapy/patient care |
| [Ru(dpp)$_3$]$^{2+}$ | C153 | n/a | EC | 1:1 | 20-80% | Fresh meat products (beef, poultry) or other foodstuffs requiring high O$_2$ MAP packaging | Pre-mixed gas cylinders, O$_2$ therapy/patient care |
| [Ru(dpp)$_3$]$^{2+}$ | BBD | n/a | EC | 1:3 | 20-80% | Fresh meat products (beef, poultry) or other foodstuffs requiring high O$_2$ MAP packaging | Pre-mixed gas cylinders, O$_2$ therapy/patient care |
| PdTFPP | BBD | n/a | EC | 1:1 | 0-5% | Foodstuffs (nuts, fish, cheese) requiring no or low O$_2$ MAP | Pharmaceutical storage, packaging of disposable sterile medical products, packaging of electronic components, all requiring no or low O$_2$ |
| PtTPP | C6 | n/a | EC | 1:1 | 0-20% | Fruits, vegetables and other oxygen- | Pharmaceutical storage, |

TABLE 1-continued

O$_2$ concentrations at which colour change observed

| Lumophore 1 (L1) | Lumophore 2 (L2) | Lumophore 3 (L3) | Polymer Matrix | Ratio L1:L2:L3 | O$_2$ concentration range where visible colour change observed | Relevant Food Sector | Other potential areas of application |
|---|---|---|---|---|---|---|---|
| | | | | | | sensitive foodstuffs (nuts, fish, cheese) requiring no or low O$_2$ MAP | packaging of disposable sterile medical products, packaging of electronic components, all requiring no or low O$_2$ |
| PtOEP | R6G | n/a | EC | 1:1 | 0-20% | Fruits, vegetables and other oxygen-sensitive foodstuffs (nuts, fish, cheese) requiring no or low O$_2$ MAP | Pharmaceutical storage, packaging of disposable sterile medical products, packaging of electronic components, all requiring no or low O$_2$ |
| PtOEP | C153 | n/a | CAP | 1:1 | 0-20% | Fruits, vegetables and other oxygen-sensitive foodstuffs (nuts, fish, cheese) requiring no or low O$_2$ MAP | Pharmaceutical storage, packaging of disposable sterile medical products, packaging of electronic components, all requiring no or low O$_2$ |
| | | | | | 20-80% | Meat products (beef, poultry) or other foodstuffs requiring high O$_2$ MAP packaging | Pre-mixed gas cylinders, O$_2$ therapy/patient care |
| PtOEP | C153 | n/a | CAB | 1:1 | 0-20% | Fruits, vegetables and other oxygen-sensitive foodstuffs (nuts, fish, cheese) requiring no or low O$_2$ MAP | Pharmaceutical storage, packaging of disposable sterile medical products, packaging of electronic components, all requiring no or low O$_2$ |
| | | | | | 20-80% | Meat products (beef, poultry) or other foodstuffs requiring high O$_2$ MAP packaging | Pre-mixed gas cylinders, O$_2$ therapy/patient care |

Example 3: Reproducibility, Stability and Time Response

The reproducibility, stability and time response of the PtOEP:C153 (1:1) sensor ink prepared in Example 1 were investigated in detail. The reproducibility of the deposition technique, data measurement and formulation preparations were all assessed by determining the oxygen sensitivities. Oxygen sensitivities were determined by measuring the emission of the sensor formulations upon 365 or 385 nm LED excitation at 298 K as a function of pO$_2$ concentration using a spectrophotometer, which gives a full spectrum of the visible and near-infrared regions (420-850 nm). The film sensitivity (expressed as $1/S_{50}$) corresponds to the reciprocal of pO$_2$ that results in quenching of 50% of the initial luminescence intensity of the sensor films (sampling size>10).

Good reproducibility was obtained, with all the sensors yielding sensitivities within the sensitivity range expected (0.082 to 0.144 Torr$^{-1}$ for wet and dry PtOEP/EC sensors, respectively, as determined by Douglas and Eaton (P. Douglas and K. Eaton "Response characteristics of thin film oxygen sensors, Pt and Pd octaethylporphyrins in polymer films", Sensors & Actuators B 2002, 82, 200-208).

The sensor formulations also displayed excellent long-term stability both as a formulation and as a printed film. Four PtOEP:C153 (1:1) EC sensors coated (1.1-1.6 μm) on glass were measured at regular intervals over a period of 5 months. The mean sensitivity determined for each sample over the 5-month period (0.096-0.106±0.015 Torr$^{-1}$) was well in the range of sensitivities expected.

To be applied as integrity indicators, the sensors developed are expected to respond almost immediately to changes in oxygen levels within the package and thus allow for real-time quality control as well as identification of damaged/leaking packages or potential issues with the gas mixtures used to fill the packages. The colour change response time of the sensors to modification of the local atmosphere, whether embedded or not in plastic films having different oxygen permeabilities, were all on the seconds to minute timescale. While these experiments were conducted on smaller volumes (4.5 cm$^3$ cell vs. ca. 1365 cm$^3$ for typical MAP raw meat packaging), the sensors of the invention should still allow the visual detection of potential leaks in the packaging within a realistic time-scale for the intended commercial uses.

Example 4: Deposition of Sensor Ink on Polymer Film Substrate

Colorimetric sensor formulations prepared according to Example 1 were printed onto different polymer substrates (PE, PET and PA) using inkjet, flexographic and gravure printing, and their oxygen concentration responses were investigated in the same way as in Example 2. For the inkjet printing, the viscosities of the sensor formulations were adjusted to below 10 mPa·s by decreasing the wt % of the polymer from 10% to ~1-2.5 wt %). Higher viscosities could be used for flexographic and gravure printing. The viscosity of the formulation is mainly affected by the weight of the polymer matrix used; with ~10-12 wt % of polymer useful for flexographic printing, and ~9-10 wt % useful for gravure.

All of the printed sensor formulations exhibited the expected colour change as a function of oxygen concentration, demonstrating that the sensor formulations could be successfully printed onto polymer films without loss of functionality.

Example 5: Preparation of Laminate Film Comprising Embedded Colorimetric Sensor The PtOEP:C153 (1:1) colorimetric sensor ink formulation was printed onto a commercially available PET film (A4 size) using a flexographic hand proofer equipped with a 200/12 anilox roll. Surface-treated (e.g. corona or plasma discharge, chemical coating) and untreated PET substrates were both tested and no difference in either the sensor response or the ink adhesion was observed.

Separately, a PE film was sprayed with an isocyanate-based adhesive using a solvent-free process. The PET sheet was then laminated to the PE film using a solventless process. In brief, the printed PET was brought into contact with the PE film that had been coated with a thin layer (~2 m) of a two-component isocyanate/polyol (polyurethane) adhesive. The laminate samples were then left at room temperature for 8 days to allow for the adhesive curing to reach completion (or close to completion). The response of the laminate as a function of oxygen concentration was then assessed as follows: A petri dish-like box was placed on top of the laminate with the gas permeable layer of the laminate (i.e. the PE layer) facing up. The oxygen concentration within the box, and only within the box, was then modified from 0 to 100% using a gas blender ($O_2$, $N_2$ mix). In such a setup, the laminate that was not covered by the box was exposed to normal atmospheric conditions, i.e. 21% $O_2$. Images were recorded under UV illumination using an inspection system or a HD camera as described before.

The colour response of the $PO_2$ variation showed good correlation to those observed for the non-laminate samples.

Example 6

The PtOEP:C153 (1:1) and PtOEP:BBD (1:1, 1:2 and 1:3) colorimetric sensor ink formulations prepared in Example 1 were each spin-coated onto the non-adhesive side of a commercially available 70 μm thick self-adhesive PE substrate (EZ-Pierce™ film, EZP-100, Excel Scientific) to form a self-adhesive sensor label. The label was adhered to the inside (i.e. food contact side) of a commercial laminate lidding film.

Example 7: Application of Colorimetric Sensor to MAP (Raw Beef)

A PtOEP:C153 (1:1) colorimetric sensor formulation was prepared as outlined in Example 1 and printed onto a PE film as described previously. In brief, a two-component acrylic-based adhesive was distributed around the sensor, before the printed PE film was sealed to the gas permeable side of a commercial PA/PE lidding film laminate via the application of an additional PE layer. This approach ensured that the sensor was held in place and did not enter into direct contact with the packaged meat at any time during the trial. The laminate film comprising the embedded colorimetric sensor was then used to seal MAP raw beef packaged under 80% $O_2$ and 20% $CO_2$.

Two shelf-life trials were performed at 4° C. over a period of 12 days, in which the packaging was deliberately damaged in different ways to simulate accidental damage during food transport, or MAP leak due to improper sealing during the packaging process. Control samples in which the packaging was undamaged were used as references for all tests. In each case the sensor response was monitored as a function of time using both qualitative (photographs) and semi-quantitative methods (RGB/CIE (x,y) colour coordinates).

16 MAP packages were prepared. Of these, 4 were left undamaged as control or reference samples (R1-R4), 4 sustained damages in the form of 5×0.8 mm holes (H1-1 to H1-4), 4 sustained damages in the form of 10×0.8 mm holes (H2-1 to H2-4), and 4 were used to simulate poor sealing (L1 to L4), which is one of the main causes of MAP leakage. In order to simulate poor sealing, a 1 cm wide piece of folded tape was inserted between the polystyrene tray and the lidding film before the packaging step. This resulted in a 1 cm space along the tray perimeter, where the PE did not heat seal properly allowing for the slow leakage/gas exchange from the packaging head space. The tape inserted was doubled (no sticky side, stronger than paper) so that it could be easily removed afterwards. Table 2 summarises the simulated packaging damage for each sample.

TABLE 2

Simulated packaging damage for samples studied during the meat storage trial.

| Sample | Description and day of the damage |
|---|---|
| R-1 to R-4 | Reference packages = no damage |
| H1-1 to H1-4 | 5 holes (0.80 mm diameter) on the lidding film - day 4 |
| H2-1 to H2-4 | 10 holes (0.80 mm diameter) on the lidding film - day 4 |
| L-1 to L-4 | Packages simulating poor sealing situation |

The packages were first kept intact at 4° C. for 4 days to ensure that the sensors worked properly, i.e. by verifying that no colour changes were observed during this period. All 4 L packages which were used to simulate poor sealing already exhibited a different colour in this timeframe demonstrating an immediate response. The remaining, undamaged 12 packages showed a blue-violet colour, indicating that no changes to the oxygen concentration had occurred.

Figure 3:
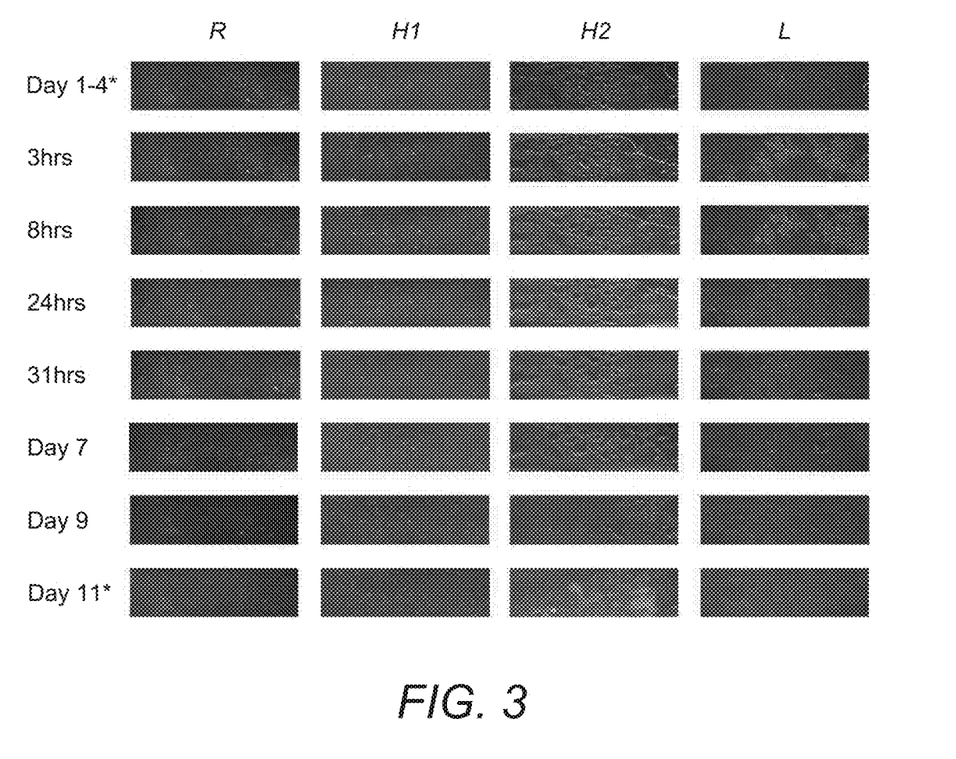
FIG. 3 shows the colour response of PtOEP:C153 (1:1) sensor formulation in a MAP raw beef packaging study.

On day 4 of the trial, the H1 and H2 packages were damaged by perforating 5×0.80 mm and 10×0.80 mm diameter holes in the lidding films, respectively, using a needle. The H2 packages (10 holes) displayed a clear colour change in less than 3 hours, after which the sensor colour response intensified with time before remaining constant over the rest of the trial (7 days). For the H1 packages, the lower number of holes resulted in a loss of the MAP over a longer period, the sensor colour response being clearly identifiable between 8 and 24 hours after damage. The colour response reached its maximum change after 31 hours, indicating that this was the point at which the MAP was lost and completely replaced by normal atmosphere (~21% $O_2$, 79% $N_2$). During the same period, no colour change response was observed from the sensors of the undamaged reference packages R1-R4. To verify that all the sensors used for the trial were working properly, at the end of day 10, all of the packages, including the reference packages were damaged significantly. All of the sensors exhibited as expected the same purplish-red colour characteristic of atmospheric oxygen levels.

The results of this experiment are shown in FIG. 3.

In order to assess the suitability of the sensors for assessing product quality, MAP raw beef was packaged in the same way as outlined above, under 80% $O_2$ and 20% $N_2$, i.e. the $CO_2$ of the MAP gas mixture was substituted by $N_2$. It was observed that when the $CO_2$ was replaced by $N_2$, the inhibitory effect of the $CO_2$ on the proliferation of bacteria was lost, and a sizeable sensor colour change response was observed as a result of bacterial growth. As the aerobic bacteria population increases, more oxygen is consumed, leading to depletion of oxygen in the package triggering a sensor response.

Example 8: Application of Colorimetric Sensor to Zero and Low Oxygen Atmospheres PE lidding films comprising (i)PtTFPP:C6 (1:1); (ii) PtTFPP:BBD (1:3) and iii) PtOEP:C153 (1:1) as prepared in Example 1, were prepared as outlined in Example 6 above. These lidding films were used to seal three empty packages under a 100% $N_2$ atmosphere to simulate the atmosphere conditions of vacuum-packed or oxygen-sensitive foodstuffs.

The packages were left untouched for the first 4 days at room temperature after which the lidding films were pierced 5 times with a 0.80 mm diameter needle. Before being damaged, the sensor displayed either an orange/dark peach colour for both PtTFPP-based sensors (i.e. PtTFPP:C6 (1:1) and PtTFPP:BBD (1:3)) or an intense pink-red colour for Pt:C153 1:1. These initial colours were still observed after 4 days indicating the absence of any leakage of the MAP. However, once the holes were pierced, fast and significant colour changes were observed (<3 hours), with the C6- and BBD-based sensor formulations turning green, and greenish yellow, respectively while the C153-based sensor formulations went from pink to violet-magenta. The sensor colour response occurred almost instantaneously and after the initial response observed within the first 3 hours, no further colour changes, apart from an intensification of the colours, were observed during the entire period remaining in the trial.

These results demonstrate that the PtTFPP:C6, PtTFPP:BBD and PtOEP:C153 sensors can be used as integrity indicators for MAP of foodstuffs that requires low to very low oxygen levels and/or vacuum packaging. Indeed, the red to purple or orange to green or greenish yellow colour change occurs for the PtOEP:C153 and PtTFPP-based system in modified atmospheres containing less than 20% $O_2$ at room temperature, making this formulation suitable for use in packaging of fruit and vegetables and for vacuum-packed or oxygen sensitive foodstuff such as nuts, fish, cheese and cooked meats.

Example 9: Application of Colorimetric Sensor to MAP (Sausages)

A PtOEP:C153 (1:1) sensor formulation was prepared as outlined in Example 1 and printed onto a PE film as described in Example 7. The PE lidding film was used to seal MAP sausages (pork & leek) under 70% $N_2$ and 30% $CO_2$, to a polystyrene tray. The packaging was then subjected to a shelf-life trial, which included piercing the lidding film of some of the packaging to simulate accidental MAP loss that can occur either during the food manufacturing or packaging process, or during transport and distribution.

16 MAP packages were prepared and subjected to a shelf-life trial in which the packages were kept at 4° C. over a period of 21 days (with the exception of T1-T4, which were kept at 20° C. to simulate temperature mis-handling, as discussed below). Of the 16 packages, 4 were left undamaged throughout as control or reference samples (R1-R4), 4 sustained damages in the form of 5×0.8 mm needle holes on day 6 (H1-1 to H1-4), 4 sustained damages in the form of 2×0.8 mm needle holes on day 7 (H2-1 to H2-4), and 4 were subjected to temperature abuse by maintaining them at 20° C. from day 1 of the trial (T-1 to T-4).

TABLE 3

Simulated packaging damage for samples studied during sausages storage trial

| Sample | Description and day of the damage |
| --- | --- |
| R-1 to R-4 | Reference packages = no damage |
| H1-1 to H1-4 | 5 holes (0.80 mm diameter) on the lidding film - day 6 |
| H2-1 to H2-4 | 2 holes (0.80 mm diameter) on the lidding film - day 7 |
| T-1 to T-4 | Simulated mishandling (temperature abuse), samples maintained at 20° C. from day 1 |

The photographs taken for all 16 packages during the first 6 days showed bright red-emitting sensors typical of the response expected in the absence of oxygen and demonstrated that the sensors worked perfectly and that no MAP loss due to unintentional damages or improper sealing occurred. On day 6 of the trial, the H1 packages were damaged by perforating 5×0.80 mm diameter holes in the lidding films. The H1 packages were then imaged every 20 minutes for the next 4 hours. The R packages were used as reference during this period and imaged every hour to verify that no colour changes occurred during this time. It was clearly observed from these images that the damaged packages started to show a slight colour change within an hour of the damage, with a definite colour change being observed between 1 and 2 hours. After 3 hours, no further changes in colour were observed, indicating that the MAP was completely lost during this short period of time and that the concentration of oxygen at this time was identical as the oxygen concentration found in normal atmospheric conditions. A similar approach was repeated with the H2 packages, but only 2 needle holes were made in the lidding films instead of the 5 previously. As expected, the colour change was slower, but a clearly detectable change was observed in less than 4 hours, indicating that the oxygen concentration within the packages was increasing. Further colour changes were observed up until 24 hours following the damage, after which no further colour changes were noticed. No colour change response was observed for the T-1 to T-4 packages over the first 7 days, despite visual inspection of the packaging indicating that the sausages were spoiled. This was because no oxygen is involved in microbial growth under anaerobic conditions. Pressure build up within the T packages due to the release of $CO_2$ as a result of anaerobic respiration prevented the recording of reliable images after day 7.

Example 10: Application of Colorimetric Sensor to Vacuum Skin Packaging of Fish (Whiting) Fillets A PtOEP:C153 (1:1) sensor was applied to the bottom tray of a skin packaged food product as follows. The sensor formulation was spin-coated onto a self-adhesive PE-based label (EZ-Pierce™ film, EZP-100, Excel Scientific). The label was then position on the thermoformed PET/PE lower tray as close as possible to the foodstuff being packed before a commercial top web/film was used to seal the fish fillets under anaerobic conditions, by heating the top web/film to soften it before vacuum sealing the packaging, forming a skin-tight seal around the shape of the product.

18 packages were prepared using this process. A further 6 packages were prepared without the incorporation of the sensor formulation, to be used for microbiological testing throughout the course of the trial.

Of the 18 packages, 10 were left undamaged throughout as control or reference samples (RB1-RB6 with black trays and RT1-RT4 with transparent trays). On day 5 of the trial, 4 packages were damaged by perforating the top web/film with 5×0.8 mm needle holes (H1-1 to H1-4) and 4 packages were damaged by perforating the top web/film with 10×0.8 mm needle holes (H2-1 to H2-4), with at least one of the holes being made in close proximity to the sensor. The packages were then imaged over the course of the trial (15 days).

TABLE 4 simulated packaging damage for vacuum skin packaging of fish.

| Sample | Description and day of the damage | Tray colour |
| --- | --- | --- |
| RB-1 to RB-6 | Reference packages = no damage | Black |
| RT1-RT4 | Reference packages = no damage | Transparent |
| H1-1 to H1-4 | 5 holes (0.80 mm diameter) on the lidding film - day 5 | Transparent |
| H2-1 to H2-4 | 10 holes (0.80 mm diameter) on the lidding film - day 5 | Transparent |

The photographs taken for all 18 packages during the first 4 days showed bright red-emitting sensors typical of the response expected in the absence of oxygen and demonstrated that the sensors worked perfectly and that no oxygen penetrated the skin packaging due to unintentional damages or improper sealing. On day 5 of the trial, 8 packages were damaged as outlined above. The damaged packages were then imaged during the rest of the trial, while the undamaged packages were used as reference or control to ensure no colour changes occurred during this time. Despite the transparent bottom trays appearing slightly fluorescent under UV illumination, thus affecting the overall colour observed for the sensor, colour changes were still clearly detected for damaged packages. As expected for such types of packaging (i.e. those with inexistent or minimal headspace), the sensor response was slower than for the MAP samples, with measurable colour change appearing only after 6 hours. However, the results show clear applicability of the sensor formulations in vacuum skin packaging.

The luminescent-based colorimetric sensors of the invention combine high sensitivity towards oxygen and can be tuned to specific oxygen concentrations via the colour change induced by luminescence quenching. The sensors enable semi-quantitative analysis to be performed based solely on the colorimetric changes induced, while ratiometric measurements can be used if required to perform fully quantitative measurements. The sensors can be used alongside digital image analysis, performed via software or an app pre-programmed with an internal sensor calibration, to provide high throughput visualisation and assessment of the sensor response. The non-destructive nature of the sensor allows continuous quality control, for example with every packaged product on an assembly line being analysed in-situ, and throughout the supply chain.

All of the features disclosed in this specification (including any accompanying claims, abstract and drawings), and/or all of the steps of any method or process so disclosed, may be combined in any combination, except combinations where at least some of such features and/or steps are mutually exclusive. Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features. The invention is not restricted to the details of the foregoing embodiment(s). The invention extends to any novel one, or any novel combination, of the features disclosed in this specification (including any accompanying claims, abstract and drawings), or to any novel one, or any novel combination, of the steps of any method or process so disclosed.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations).

It will be appreciated that various embodiments of the present disclosure have been described herein for purposes of illustration, and that various modifications may be made without departing from the scope of the present disclosure. Accordingly, the various embodiments disclosed herein are not intended to be limiting, with the true scope being indicated by the following claims.

The invention claimed is:

1. A colorimetric oxygen sensor formulation comprising a first lumophore and a second lumophore directly dispersed in a polymer matrix, wherein:
   (i) the first lumophore is platinum 5,10,15,20-tetrakis(2,3,4,5,6-pentafluorophenyl)porphyrin (PtTFPP) and the second lumophore is 2,3,6,7-tetrahydro-9-trifluoromethyl-1H,5H-quinolizino(9,1-gh) coumarin (C153);
   (ii) the first lumophore is platinum octaethylporphyrin (PtOEP) and the second lumophore is 2,3,6,7-tetrahydro-9-trifluoromethyl-1H,5H-quinolizino(9,1-gh) coumarin (C153);
   iii) the first lumophore is platinum octaethylporphyrin (PtOEP) and the second lumophore is 7-benzylamino-4-nitrobenz-2-oxa-1,3-diazole (BBD);
   (iv) the first lumophore is platinum octaethylporphyrin (PtOEP) and the second lumophore is rhodamine 6G (R6G);
   (v) the first lumophore is ruthenium (II) 4,7-diphenyl-1,10'-phenanthroline [Ru(dpp)3]$^{2+}$ and the second lumophore is 3-(2-benzothiazolyl)-7-(diethylamino) coumarin (C6);
   (vi) the first lumophore is ruthenium (II) 4,7-diphenyl-1,10'-phenanthroline [Ru(dpp)3]$^{2+}$ and the second lumophore is 2,3,6,7-tetrahydro-9-trifluoromethyl-1H,5H-quinolizino(9,1-gh) coumarin (C153);
   (vii) the first lumophore is ruthenium (II) 4,7-diphenyl-1,10'-phenanthroline [Ru(dpp)3]$^{2+}$ and the second lumophore is rhodamine 6G (R6G);
   (viii) the first lumophore is platinum meso-tetraphenylporphyrin (PtTPP) and the second lumophore is 3-(2-benzothiazolyl)-7-(diethylamino) coumarin (C6);
   (ix) the first lumophore is platinum meso-tetraphenylporphyrin (PtTPP) and the second lumophore is 2,3,6,7-tetrahydro-9-trifluoromethyl-1H,5H-quinolizino(9,1-gh) coumarin (C153);
   (x) the first lumophore is platinum meso-tetraphenylporphyrin (PtTPP) and the second lumophore is 7-benzylamino-4-nitrobenz-2-oxa-1,3-diazole (BBD);
   (xi) the first lumophore is platinum meso-tetraphenylporphyrin (PtTPP) and the second lumophore is rhodamine 6G (R6G);
   (xii) the first lumophore is palladium 5,10,15,20-tetrakis (2,3,4,5,6-pentafluorophenyl)porphyrin (PdTFPP) and the second lumophore is 3-(2-benzothiazolyl)-7-(diethylamino) coumarin (C6);
   (xiii) the first lumophore is palladium 5,10,15,20-tetrakis (2,3,4,5,6-pentafluorophenyl)porphyrin (PdTFPP) and the second lumophore is 2,3,6,7-tetrahydro-9-trifluoromethyl-1H,5H-quinolizino(9,1-gh) coumarin (C153);
   (xiv) the first lumophore is 4,7-diphenyl-1,10'-phenanthroline ([Ru(dpp)3]$^{2+}$) and the second lumophore is 7-benzylamino-4-nitrobenz-2-oxa-1,3-diazole (BBD);
   (xv) the first lumophore is platinum 5,10,15,20-tetrakis (2,3,4,5,6-pentafluorophenyl)porphyrin (PtTFPP) and the second lumophore is 7-benzylamino-4-nitrobenz-2-oxa-1,3-diazole (BBD); or
   (xvi) the first lumophore is palladium 5,10,15,20-tetrakis (2,3,4,5,6-pentafluorophenyl)porphyrin (PdTFPP) and the second lumophore is 7-benzylamino-4-nitrobenz-2-oxa-1,3-diazole (BBD).

2. A colorimetric oxygen sensor formulation as claimed in claim 1, wherein the polymer matrix is selected from polystyrenes, polyvinyls, polyamides, polyurethanes, acrylates, shellac, rosin, rosin esters, celluloses and cellulose-derivatives; and mixtures thereof.

3. A colorimetric oxygen sensor formulation as claimed in claim 1, wherein the ratio of lumophore 1: lumophore 2 is from 1:4 to 2:1.

4. A colorimetric oxygen sensor formulation as claimed in claim 1, wherein the colorimetric oxygen sensor formulation comprises a third lumophore dispersed in the polymer matrix.

5. A colorimetric oxygen sensor formulation as claimed in claim 1, wherein the formulation is in the form of an ink.

6. A method of determining the oxygen content of an atmosphere, the method comprising exposing the colorimetric oxygen sensor formulation of claim 1, to the atmosphere; applying a source of UV or UV-Visible excitation to the formulation, and observing the colour of the formulation wherein the method further comprises comparing the colour of the formulation with a reference colour to make an assessment of the oxygen content.

7. A method of determining the oxygen content of an atmosphere as claimed in claim 6, where observing the colour of the formulation is performed via the naked eye, via the use of spectrometry, or via the use of a digital imaging apparatus.

8. A method as claimed in claim 6, wherein the atmosphere is a food packaging atmosphere.

9. A method of preparing a laminate film or label comprising a colorimetric oxygen sensor, wherein the method comprises printing a layer of the ink of claim 5 onto a substrate, optionally a polymer substrate film.

10. A method as claimed in claim 9, wherein the printed polymer substrate film is laminated with a second polymer substrate film such that the ink layer is entrapped between the polymer substrate films.

11. A method as claimed in claim 9, wherein the lamination is performed by thermal means, by the use of an adhesive, or by a combination thereof.

12. A laminate film comprising a colorimetric oxygen sensor formulation as claimed in claim 1.

13. A food packaging laminate film or label comprising the colorimetric sensor formulation of claim 1 printed on a substrate, wherein the sensor formulation exhibits a colour change in response to a change in the oxygen concentration in an atmosphere or local environment to which it is exposed, said colour change being visible to the naked eye upon the application of a UV/UV-vis light source.

* * * * *